US00RE37574E

(19) United States
(12) Reissued Patent
Rawlins

(10) Patent Number: US RE37,574 E
(45) Date of Reissued Patent: Mar. 5, 2002

(54) METHOD AND APPARATUS FOR MAPPING CROP QUALITY

(76) Inventor: Stephen L. Rawlins, 2638 Eastwood Ave., Richland, WA (US) 99352

(21) Appl. No.: 09/329,628

(22) Filed: Jun. 9, 1999

Related U.S. Patent Documents

Reissue of:
(64) Patent No.: 5,845,229
Issued: Dec. 1, 1998
Appl. No.: 08/738,732
Filed: Oct. 28, 1996

(51) Int. Cl.[7] ..... G06F 19/00
(52) U.S. Cl. ..... 702/2
(58) Field of Search ..... 702/2, 5; 47/1.7; 56/1, 10.2 A–10.2 H; 73/861.73

(56) References Cited

U.S. PATENT DOCUMENTS

| | | | | | |
|---|---|---|---|---|---|
| 4,630,773 | A | * | 12/1986 | Ortlip | 239/1 |
| 4,682,999 | A | * | 7/1987 | Young | 72/28 |
| 5,282,389 | A | * | 2/1994 | Faivre et al. | 73/861.73 |
| 5,318,475 | A | * | 6/1994 | Schrock et al. | 460/1 |
| 5,327,708 | A | * | 7/1994 | Gerrish | 56/1 |
| RE35,100 | E | * | 11/1995 | Monson et al. | 111/130 |
| 5,467,271 | A | * | 11/1995 | Abel et al. | |
| 5,487,702 | A | * | 1/1996 | Campbell et al. | 56/10.2 B |
| 5,510,798 | A | * | 4/1996 | Bauer | 342/357 |
| 5,585,626 | A | * | 12/1996 | Beck et al. | 47/1.7 |
| 5,666,793 | A | * | 9/1997 | Bottinger | 56/10.2 A |
| 5,686,671 | A | * | 11/1997 | Nelson et al. | 73/861.73 |
| 5,689,418 | A | * | 11/1997 | Monson | 702/2 |
| 5,699,244 | A | * | 12/1997 | Clark, Jr. et al. | 702/2 |

OTHER PUBLICATIONS

"Ag–Navigator Fully Integrate Real–Time Navigation and Mapping for Site–Specific Agriculture", Product Brochure Ashtech, 2 pp., Jan. 1996.*

"Cowlitz Falls Fish Passage Facility System Specifications", Biomark, Inc., 5 pgs., Jan. 9, 1996.*

"HM–500 Yield Mapping System", Product Bulletin, HarvestMaster, 2 pgs., Jan. 1996.*

E. F. Prentice, et al., "PIT–Tag Monitoring Systems for Hydroelectric Dams and Fish Hatcheries", American Fisheries Society Symposium, vol. 7, 323–334, published Jan. 1990.*

Larry Reichenberger, "Data in a hat—The computer–toting, antenna–driven, voice–activated 'data cap' does what no hat has done before", Farm Journal, p. 17, Oct. 1993.*

* cited by examiner

*Primary Examiner*—Donald E. McElheny, Jr.
(74) *Attorney, Agent, or Firm*—Schwegman, Lundberg, Woessner & Kluth, P.A.

(57) ABSTRACT

A harvester which has a global-positioning system is used to harvest crops. Fields to be harvested are divided into individual field areas for crop quality assessment selected by the farmer. Values representing the location of the selected individual field areas or crop management areas are loaded into storage on a computer or recorded. The harvester also includes a dispenser of crop markers. Each crop marker has a unique identifier when compared to the other crop markers used during the harvest. The global-positioning system determines actual field location during the harvest and when an actual field location is close or matches one of the selected field locations, a trigger signal is sent to the dispenser and a crop marker is inserted into the harvested crop stream. A table of selected field locations and the crop markers inserted into the crop stream from that field location is stored. Later on in processing, the crop marker is detected and a sample of the crop is taken from around the crop marker. A similar system is used for orchard crops. A picker harvests the fruit off a tree and when the task is complete, the picker places some of the fruit from the tree in a bag which is tied shut. A marker such as a bar code label is placed on the bag and a quality test is performed on the fruit in the bag.

33 Claims, 6 Drawing Sheets

METHOD AND APPARATUS FOR MAPPING CROP QUALITY

Matter enclosed in heavy brackets [ ] appears in the original patent but forms no part of this reissue specification; matter printed in italics indicates the additions made by reissue.

FIELD OF THE INVENTION

The present invention relates to the field of precision farming. More particularly, this invention relates to an application of precision farming to measure and map crop quality.

BACKGROUND OF THE INVENTION

The concept of providing the best resources to the most efficient users of the resources has been around for a long time. This concept is also present in agriculture. One of the most common applications of this concept is to a herd of dairy cattle. Dairymen weigh the milk from each cow and tailor the feed ration to match the productive potential of the particular cow. For example, the most productive cows may have gotten an extra scoop of grain in the old days. Nowadays, the concept has been further refined so that the production from a particular cow is optimized with several inputs.

The concept has been extended in the agricultural setting to crops and the fields which produce the crops. Individual areas of cropped fields have different production potentials. Existing technology now allows yield maps to be constructed for cropped fields. Over the course of several years, farmers can monitor the yields as well as the resources devoted to producing the yields. Once a base amount of data is obtained for a particular individual area of a field, the farmer can then alter some of the resources applied to an individual area and note the effects in terms of the yield. Ultimately, the farmer can optimize the resources used to produce an optimized yield. This will allow farmers to reduce the use of chemicals, irrigation water and other inputs to cropped fields to a bare minimum. The farmer is able to maximize profit by minimizing the expenses necessary to produce a crop. The environment is also favorably impacted since only a minimum amount of chemicals is applied to the field.

The concept of optimizing the inputs to individual areas of a field has been called precision farming. Practical application of precision farming has grown rapidly with the introduction of relatively inexpensive global-positioning systems. One might say that the less expensive global-positioning systems have enabled precision farming to emerge from a textbook concept to something that can be applied today by farmers. Tractors are outfitted with a computer having memory, and a global-positioning system so that the individual areas of the fields can be located. The locations of the individual field areas and their respective treatment are stored in the computer. The global-positioning system identifies the particular field areas. The computer retrieves the information with respect to the inputs or the resources to be applied to the particular area of the field and then controls various implements to apply the resources appropriately. For example, a planter is controlled by a computer during planting to dispense more or less seed to the land in a specific individual area of the field. Another implement controlled by a computer in an application of precision farming is an applicator used to distribute fertilizer, herbicides or other chemicals to the field at spatially-variable rates. The digital map containing the rate at which the applicator applies each of these chemicals to each area of the field is stored in the onboard computer which is connected to the global-positioning system.

The current applications of precision farming in use today have some deficiencies. Amongst the deficiencies is the overemphasis of yield as the only meaningful output. There is a need to expand to other meaningful outputs so that application of resources to crops can be optimized with regard to these other outputs. There is also a need to factor all the meaningful outputs or measures into decisions for application of resources. In addition, there is a need for tracking other outputs and for tracking crops with respect to other outputs for future applications of precision farming.

SUMMARY OF THE INVENTION

In this invention, precision farming is given the capability to measure and map the quality of the product from a field crop or an orchard crop. For field crops a harvester equipped with a global-positioning system is enhanced by the addition of a system to mark samples for quality analyses as well as measure the quantity of the harvested product.

The farmer selects a sampling pattern for mapping quality parameters. Values representing longitude and latitude for the selected sampling points are loaded into storage on a computer or are recorded. The harvester includes a dispenser of crop markers. Each crop marker has a unique identifier, when compared to the other crop markers used to harvest a large area, that can, ideally, be remotely scanned. The global-positioning system determines actual field location during the harvest, and when an actual field location is close to or matches one of the selected field sample locations, a trigger signal is sent to the dispenser and a crop marker is inserted into the harvested crop stream. As the marker is deployed or inserted into the crop stream, the marker's unique identifier number is scanned, and recorded in a table of field sample locations versus crop marker identification numbers. Later on in processing, the crop marker is detected and a sample of the crop is taken from the volume surrounding the crop marker. A quality test is performed on the sample, and a map for each quality parameter is constructed using the table of positions at which each marker was inserted into the stream of harvested crop.

A similar system is used for orchard crops, except in this case the new system includes both recording the yield and maintaining the identity of quality samples from each tree. This system uses the same remotely scannable identification tags and scanners specified for the field crop harvester. The system is tailored to meet the needs of a hand-picked crop. It accomplishes the following: (1) records the weight of crop picked by each employee, (2) records the weight of crop produced by each tree, and (3) maintains the tree identity of a sample of fruit from each tree upon which quality analyses can be performed.

Each tree is marked with a permanent ID, such as with numbers on the field, row, and tree number within each row. Plastic cards with electronically scannable tags are attached to each tree. The scannable tags may directly read out the information used for the permanent ID. The scannable tag may also read out an identifier other than the information used to permanently mark the tree. If the identifier is different than the permanent ID information, then a table is needed to correlate the identifier with the permanent ID.

A second set of plastic cards are also prepared for each employee picking fruit. The cards can also be of any size but preferably are about the size of playing cards. Each card is also imprinted with the employee number of each picker. Prior to harvest, a table of the employee number versus identification tag number is prepared by keying in the imprinted numbers and scanning the identification number on each tag.

Each picker wears two markers or scannable tags, one to identify the tree and one to identify the picker. The picker fills a sample bag with a portion of fruit. Two scanners are used to scan the marker tags. The picker walks across a scale to the fruit storage unit. The weight of the picker is subtracted from the combined weight of the picker and the fruit each time the picker crosses the scale. The weight of fruit from the tree can then be totaled. A marker from the tree is also used or attached to a bag containing a representative sample from the tree. Quality tests are run on the fruit in the sample bag.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
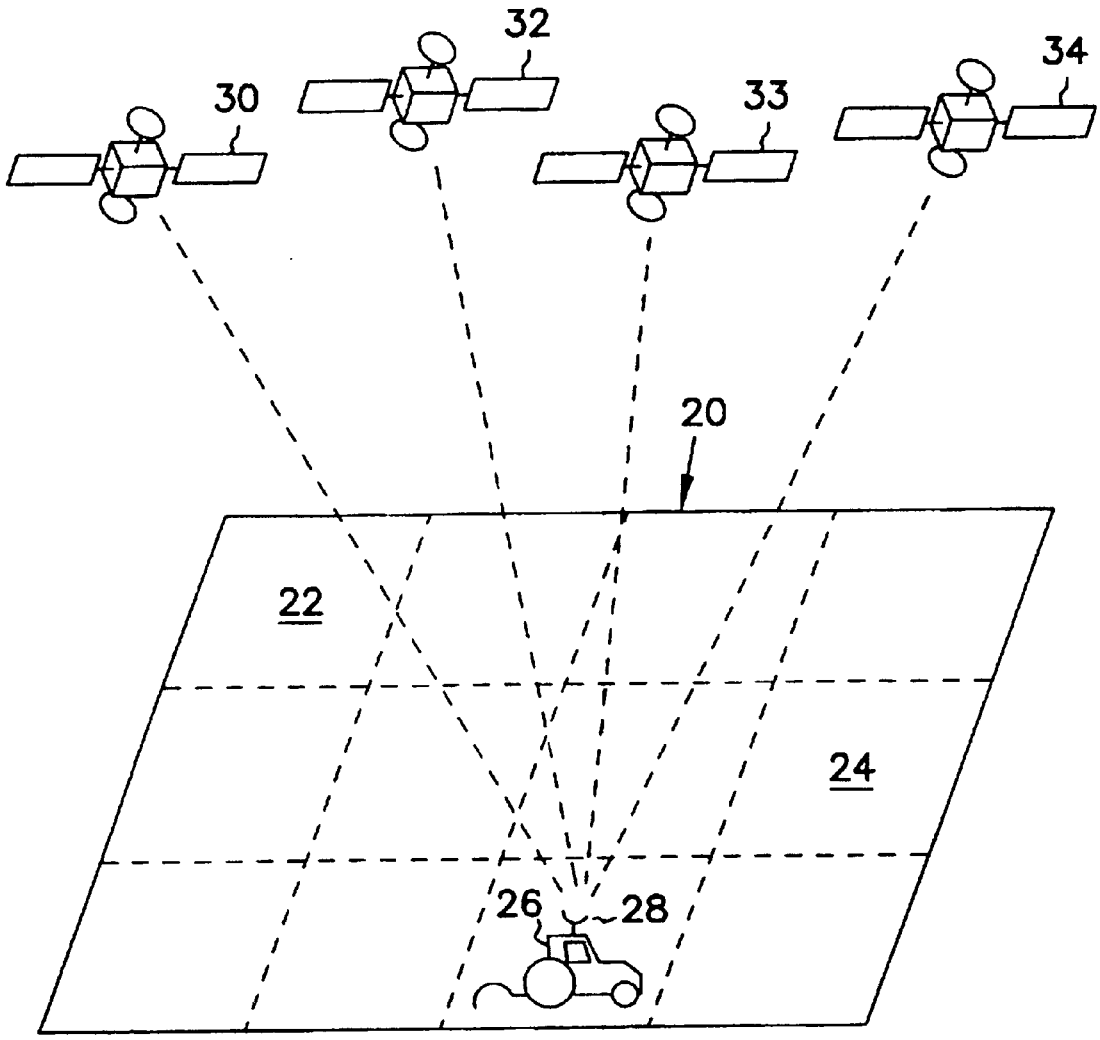
FIG. 1 is a isometric view of a field crop harvester in a field which has been divided into individual areas for assessment of crop quality.

FIG. 1 shows a field 20 which has imposed upon it a grid pattern for crop quality sampling. Area 22 and area 24 are portions of the field 20 that are defined by the grid. It should be noted that the grid size and the crop quality sampling areas 22 and 24 can be of any size and that the grid shown in dotted lines in FIG. 1 will not be actually seen but would represent the sampling points of crop management areas defined in terms of longitude and latitude. It should also be noted that the grid is not fixed as shown in FIG. 1. Several variables may be measured for a single crop. A harvester 26 is shown in the field harvesting crops. The harvester 26 is outfitted with a global-positioning system 28 which is represented by a GPS radio antenna. Hovering above the earth are at least four satellites 30, 32, 33 and 34. Four satellites are required to determine x-y position on the earth. Three satellites are needed for triangulation. The fourth satellite is used to correct for errors in satellite clocks. Currently available global-positioning systems typically being used in precision farming can determine position with an accuracy to within three to five feet.

Figure 2:
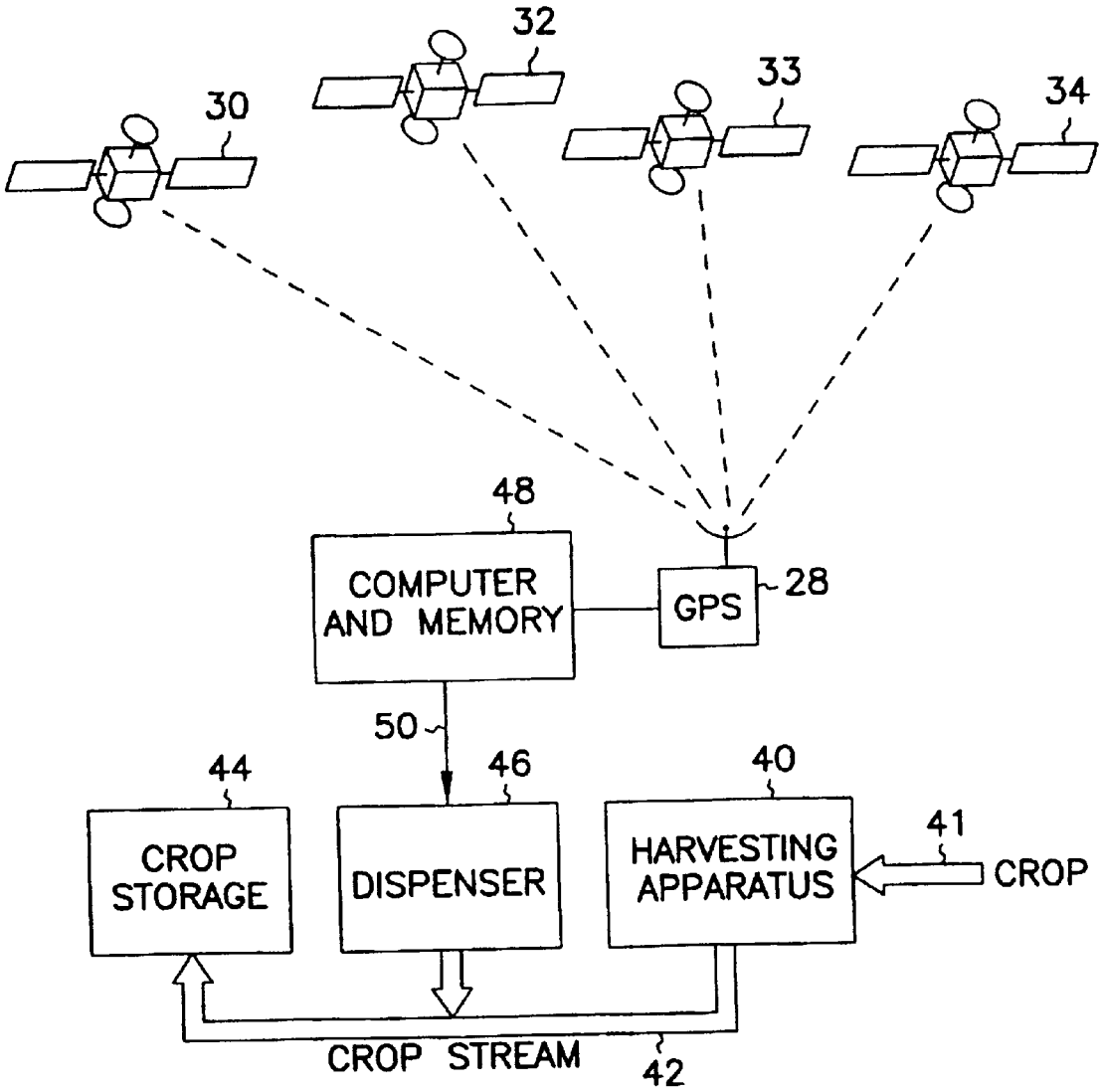
FIG. 2 is a schematic diagram of the principal electrical and mechanical components of a crop-harvesting system.

FIG. 2 shows a schematic diagram of the principal electrical and mechanical components of a crop-harvesting system constructed in accordance with the preferred embodiment of the present invention. FIG. 2 shows the harvester 26, the global-positioning system 28 and the four satellites 30, 32, 33 and 34. The harvester 26 is any type of harvester including a combine for harvesting grains such as corn, wheat or soybeans. Harvester 26 can also be a specialized harvester such as those that harvest cotton, sugar beets or potatoes. The harvester 26 includes a harvesting apparatus 40. The harvester is typically driven through the crop 41. The crop 41 is input to a harvesting apparatus which removes the crop from the field, represented as an arrow input to the harvesting apparatus 40 in FIG. 2. The harvesting apparatus, for example, would include the particular crop head on a combine. Once the harvesting apparatus has removed the crop from the field, it processes the crop and moves it to some form of crop storage 44. Typically there is a crop stream 42 which is between the harvesting apparatus 40 and the crop storage 44. The crop stream 42 can include any type of crop which is in any stage of processing. It should be noted that different harvesting apparatuses 40 may process the crop 41 into different products which enter the crop stream 42. For example, modern combines for field corn strip the corn off the cob so that the crop stream comprises kernels of corn. A harvesting apparatus for sweet corn may merely pick the corn ears but not strip the kernels off the cob. In the latter instance, the crop stream would consist of corn on a cob. The crop stream 42 typically goes into crop storage 44. Crop storage can also be in any form. For example, crop storage may be in a bin that is associated with, or attached to, the harvester 26 or crop storage can be something separate, such as a truck that drives beside a harvester until the truck is full. For the sake of simplicity, the crop storage 44 is shown as part of the harvester 26. The harvester of the invention also includes a dispenser 46 which dispenses crop markers (shown in FIGS. 4 and 5) into the crop stream 42. The harvester 26 also includes a computer and memory 48 which is attached to the global-positioning system 28. It should be understood that the computer and memory 48 can be separate and apart from the global-positioning system 28 or could be a portion of the global-positioning system 28. The computer and memory 48 outputs a trigger signal 50 to the dispenser 46. The trigger signal is represented by line 50 in FIG. 2. When a trigger signal is sent, the dispenser 46 dispenses a crop marker. The trigger signal is actually produced by the computer and memory 48 which determines when a trigger signal is to be sent. The computer and memory is any combination of hardware, software instructions and data that are used to produce the trigger signal 50.

Figure 3:
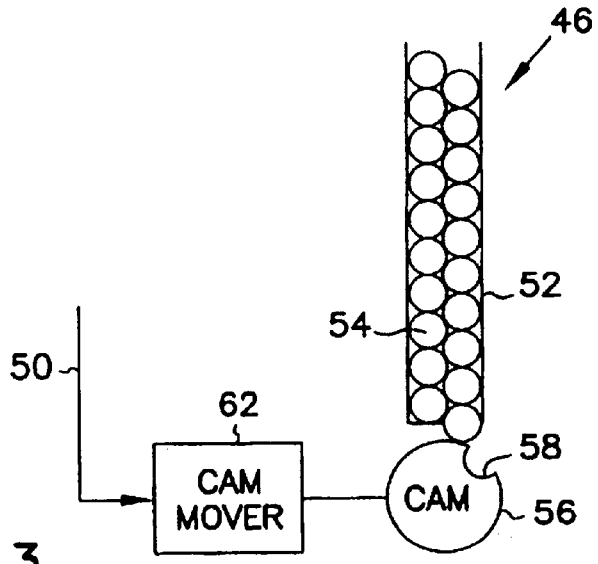
FIG. 3 is a schematic diagram illustrating details of the marker dispensing unit for a bulk crop such as potato or sugar beet.

FIG. 3 details the dispenser 46. The dispenser 46 includes a marker holder 52 which holds a plurality of markers 54. The dispenser also includes a cam 56 having a cutout cavity 58 therein. The cutout cavity 58 is shaped to receive one of the markers 54. The cam 56 is moved by a mechanism 62. Movement of the cam mechanism 62 is controlled by the trigger signal 50. When the cam moves, one of the markers 54 held in the cutout cavity 58 is dropped into the crop stream 42 (see FIG. 2). When the cavity is empty, the cavity is filled with another marker 54 before another trigger signal is received.

Figure 4:
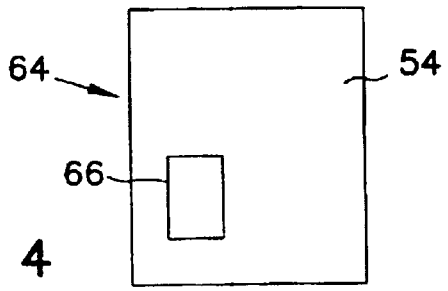
FIG. 4 is a schematic diagram of a marker.

FIG. 4 shows a schematic diagram of a marker 54. The marker 54 includes a container 64 and an electronic tag 66 housed within said container 64. The electronic tags 66 are passive radio frequency identification tags such as the Passive Injectable Transponder (PIT) tags manufactured by the Destron-Fearing Company, which are available in the U.S. from Biomark of Boise, Id. The model TX 1410L is ideally suited for this purpose. These identification tags are very small, having dimensions of about 2 mm in diameter and 20 mm long. Each tag 66 is coded with one of over 34 billion unalterable individual code numbers, giving it a uniquely identified number from the other markers used in a particular field or in a particular application. The passive radio frequency ID tag produces or emits a radio frequency in the presence of another radio frequency. In other words, in the presence of a radio signal having a first radio frequency, the electronic tag 66 produces a radio signal having a second frequency. The radio signal having the second frequency can carry a unique identifying mark as part of the second radio frequency signal. It should also be noted that the markers 54 need not include an electronic tag 66. The markers could also include numbers or lettering on the external portion of the container 64 which could be used to uniquely identify each marker. In addition, it is understood that other ways to uniquely identify the marker could also be used and that would be encompassed in the scope of this invention.

Figure 5:
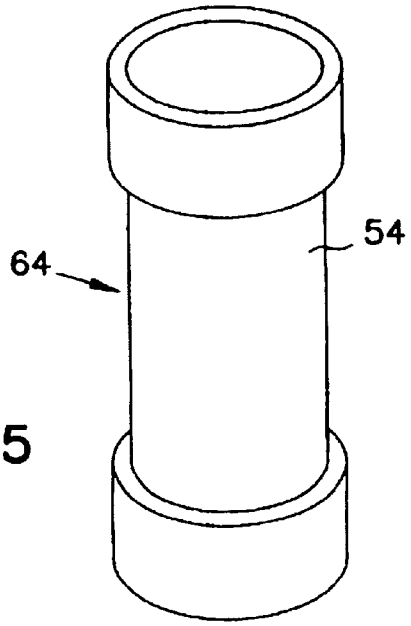
FIG. 5 is an isometric view of a marker for insertion into a crop stream of potatoes.

Now turning to FIG. 5, a marker 54 for a particular crop is shown. A major design consideration for a marker 54 is that, after insertion into a crop stream, the marker will not migrate or will migrate to a minimum extent from the volume of crop product harvested in its immediate vicinity. The marker shown in FIG. 5 is a marker that is used during the harvesting of potatoes and because it is approximately the same size shape and density of a typical potato it can be inserted into a crop stream of potatoes without migrating to a large extent. The container 64 of the marker 54 is made of a 6-inch length of 1½-inch PVC pipe with end caps cemented in place. The container 64 includes a passive radio frequency identification tag (not shown) and is filled with paraffin wax. Filling the marker with paraffin wax gives the marker a specific gravity near 1.0 and a weight of 13 ounces which replicates a typical potato. The result is a durable, practical and inexpensive crop marker 54 with minimal migration.

Figure 6:
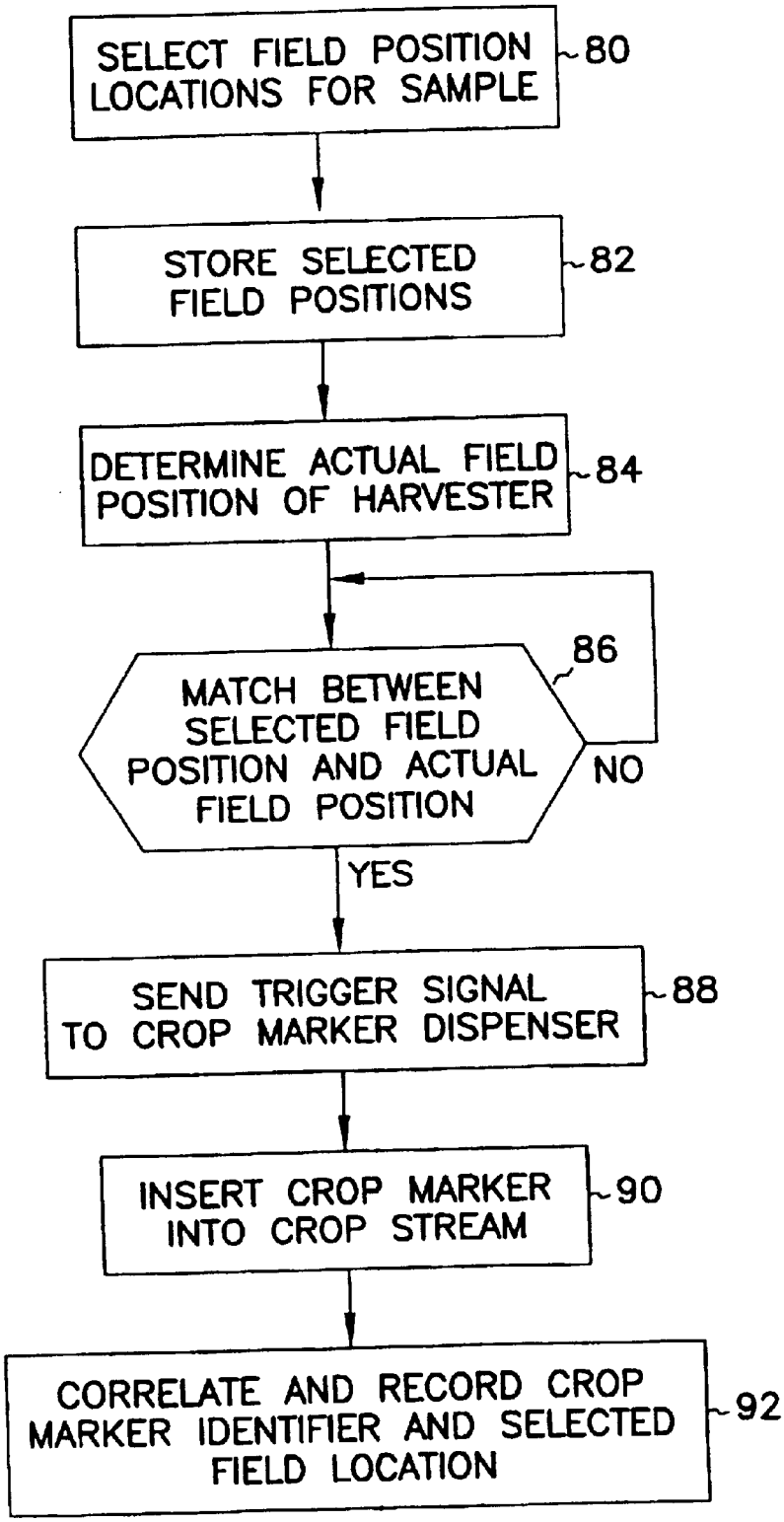
FIG. 6 is a flow diagram for harvesting a crop.
Figure 8:
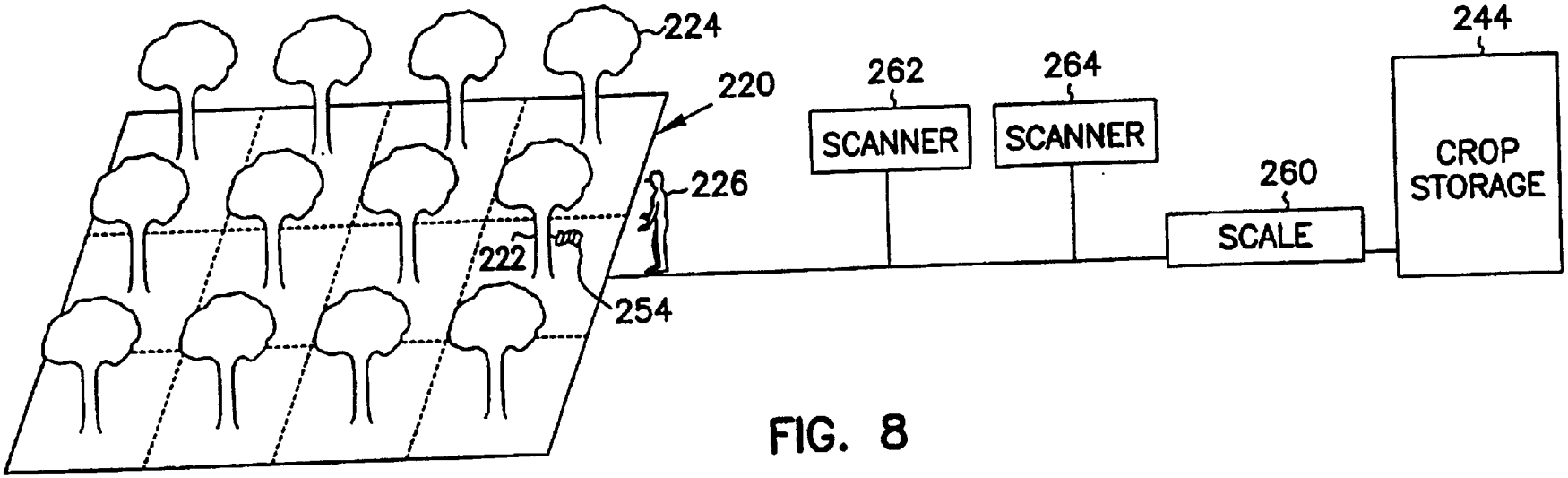
FIG. 8 is an isometric view of a system that includes a picker in an orchard which has been divided into individual crop management areas.
Figure 9:
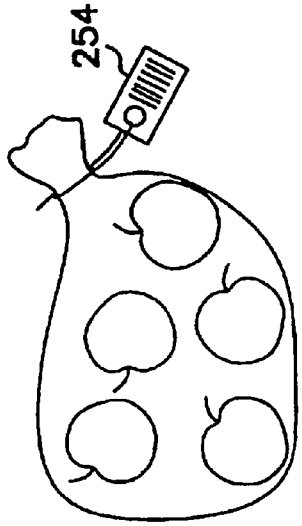
FIG. 9 is a schematic diagram of a marker and sample from an orchard.

FIG. 6 shows the operation and steps used for the system shown and discussed in FIGS. 1–5 above, as well as for a second system that will be discussed briefly and is as shown in FIGS. 8 and 9. The first step in the operation is to select the field locations that the farmer would like to have samples, which is depicted by step 80 in FIG. 6. There are many factors that a farmer may take into consideration when selecting a field location for a sample, such as soil quality or position of the individual field area 22. For example, the individual field area may be in a low area near a river and so the farmer would like to see how the location affects the quality of the crop output from that particular individual field area. Once the field locations for sampling have been selected, the selected field positions are stored, as depicted by box 82. The selected field positions can be stored in the memory of the computer and memory 48 shown in FIG. 2. It is also contemplated that the selected field positions could be stored on a sheet of paper or on a table. The next step in the process is to determine the actual field position of the harvester while it is harvesting the crop. In the embodiment shown in FIGS. 1–5, a global-positioning system 28 is used to determine the actual position of the harvester. It should be noted that field position could also be determined by a number of other techniques, including keeping track of the set of rows the harvester is on and measuring the distance along the row from the end of the field. The actual field position is input to the computer and memory 48 which can be part of the global-positioning system 28. The computer and memory system 48 determines if there is a match between a selected field position and an actual field position. This is shown as decision box 86 in FIG. 6. If there is not a match between the selected field position stored in the computer and memory 48 and an actual field position from the global-positioning system 28, then the actual field position of the harvester is redetermined. The actual position of the field harvester is determined on a timed basis and is repeated periodically. The actual field position could also be determined continuously or at very short time intervals. If a match is found between a selected field position and an actual field position, then a trigger signal is sent to the crop marker dispenser, as depicted by box 88 in FIG. 6. In the embodiments shown in FIGS. 1–5, the computer and memory 48 uses an input from the global-positioning system as well as the data stored in memory, hardware and software to determine if there is a match between the selected field position and actual field position. It should be noted that there doesn't have to be an exact match between the actual field position and the selected field position and that a match could also be defined as being within a certain proximity of the selected field position. For example, the selected field position might be at the center of an individual field area or crop management area such as 22. The global-positioning system attached to the harvester may not pass exactly over the center of that particular individual field area 22 since the global-positioning system is attached to a harvester which may make a wide swathe through a field. Therefore, in order to test the particular individual field area, a match would have to be described as being within a proximate area of the actual selected field position. Computer software and hardware within the computer and memory 48 can be used to determine the match or approximate match.

Figure 7:
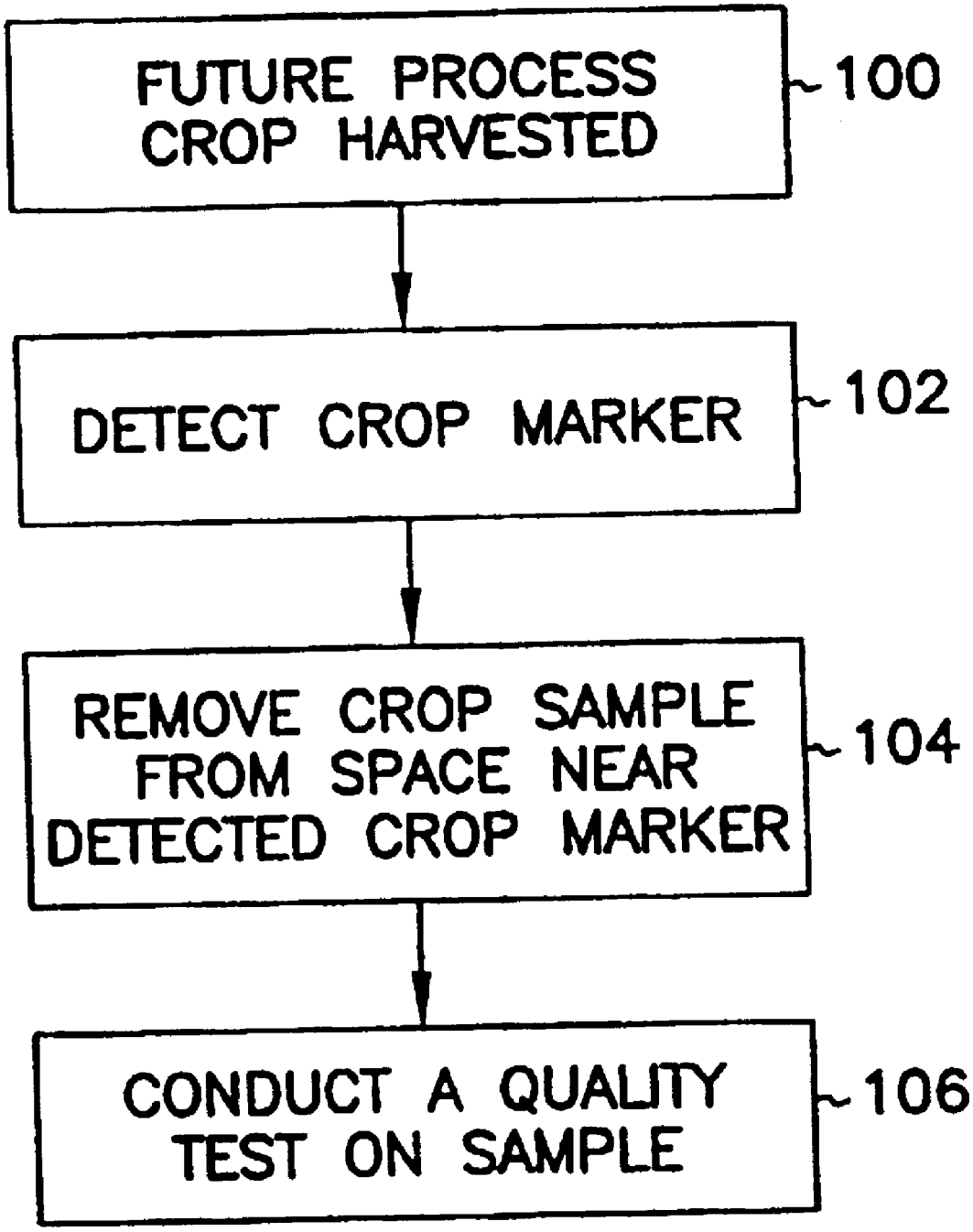
FIG. 7 is a flow diagram for handling a crop after harvesting.

Once a match is found, the trigger signal is sent to the dispenser 40. In response to the trigger signal, the dispenser 40 inserts a crop marker into the crop stream as depicted by step 90. The crop marker is identified by some sort of identification means before or at the same time as the crop marker is inserted into the crop stream. Once inserted into the crop stream, the particular crop marker which has a unique identifier must be correlated to the selected field position where it was inserted into the crop stream. In the particular system shown in FIG. 2, the computer and memory 48 could be used to store a table which correlates the particular crop marker and its field location. Other data, of course, could also be stored in the computer and memory 48 (shown in FIG. 2). Once the crop marker is inserted into the crop stream, the crop marker travels with the rest of the harvested crop into crop storage 44 and undergoes further processing which is depicted by reference numeral 100 in the flow chart shown in FIG. 7. Typically, the further processing might include transport of the crop to a loading dock. The next step in the process is to detect the crop marker which is shown by box 102. The crop marker 54 can be detected by visual inspection or, with the system shown in FIGS. 1–5, a radio wave of a first frequency directed toward the crop. When a crop marker 54 that includes an electronic tag 66, such as the one shown in FIGS. 4 and 5, passes the radio transmitter emitting the first radio signal, the electronic tag 66 produces a radio signal at a second frequency. The radio signal at the second frequency includes a unique identifier portion used to identify the crop marker. Once detected, a sample from the volume near the crop marker is removed as depicted by step 104 in FIG. 7. The sample is related back to the particular selected field location by the table or means by which the crop marker identifier and the selected field location are correlated. Once the sample is taken, quality tests are performed or conducted on the example as depicted by step 106. It should be noted that these tests can consist of grading under U.S.D.A. standards or any other tests based upon standards which determine market price advantage.

The end result is that the marker is used to mark a portion of the crop while it is in the crop stream from a selected field area. The crop marker 54 is designed so that it will not migrate or so that migration will be minimized while it is in the crop stream and placed into crop storage. Since the marker migration is minimized, when the crop marker is later detected as in step 102, the assumption can be made that the portion of the crop near the crop marker is also from the same field location or selected field location as that at which the crop marker was inserted into the crop stream. The sample taken then is considered to be a sample from the selected field location that is desired.

Data on the quality of the crop can then be kept with respect to the selected field locations. Additional data can be collected on the selected field locations such as the amount of pesticide or herbicide and the amount of fertilizer and water applied to the selected field location. Over the course of years, the data can be collected and analyzed to determine which inputs of resources determine or optimize the quality of data obtained through the above method. The inputs can be modified to see how quality differs. Once enough data are gathered, the quality as an output can be optimized with respect to selected inputs. Furthermore, the profits for a quality crop can be compared to profits associated with a maximum yield plan from the same individual field area or crop management area 22 or 24.

Now turning to FIG. 8, a system is shown for mapping the crop quality of an orchard. FIG. 8 shows a field 220 having individual field areas 222 and 224. The grids shown in FIG. 8 are imaginary just as the grids shown in FIG. 1 and the individual field areas or crop management areas can actually be individual trees which yield a crop such as apples or oranges. If the crop is harvested with a mechanical harvester, as is frequency the case for nuts, pie cherries and other fruits, a system similar to that described above for field crops can be used to map quality factors. In many kinds of orchards, mechanical harvesters are nonexistent so the harvester in this case is actually a human fruit picker 226. In this particular scenario, a global-positioning system is not necessarily needed as individual markers 254 can be placed directly on individual trees. The markers used might be a bar-code label which can be scanned with a bar-code scanner. The markers could also just be numbers on a tree. The system includes a scale 260 and a first scanner 262 and a second scanner 264. The crop is stored in crop storage 244.

Each tree 222 is marked with a permanent ID, such as with numbers on the field, row, and tree number within each row. Markers 254 in the form of plastic cards with electronically scannable tags are also attached to each tree 222. The scannable tags may directly read out the information used for the permanent ID. The scannable tag or marker 254 may also read out an identifier other than the information used to permanently mark the tree. If the identifier is different than the permanent ID information, then a table is needed to correlate the identifier with the permanent ID. The cards can be any size. Cards the size of playing cards are shown. The scannable identification tags or markers 254 can be attached to a card by shrink wrapping. Each card is also imprinted with the identification number of a specific tree 222. Prior to harvest, tables of tree identification number versus identification tag or marker number, are prepared by keying in the imprinted numbers and scanning the identification number on each tag.

A second set of plastic cards or markers are also prepared for each employee picking fruit. The cards can also be of any size but preferably are about the size of playing cards. Each card is also imprinted with the employee number of each picker. Prior to harvest, a table of the picker 226 or employee number versus identification tag number is prepared by keying in the imprinted numbers and scanning the identification number on each tag.

Prior to harvest, arm bands, for example with Velcro straps, with pockets for the tree identification tags and the employee identification tags are prepared. Each picker 226 wears an arm band on one arm containing the marker tag with his personal identification number, and an arm band on the other arm to hold the marker identification tag 254 for the tree he is picking fruit from.

In operation, a picker 226 harvests all the fruit from a particular tree, such as tree 222 having marker 254. The picker 226 attaches the marker 254 from a particular tree 222 to himself at the beginning of harvesting from the tree 222. The marker can be attached by placing the marker in a clear plastic pocket in an arm band. The marker 254 from tree 222 stays attached to the picker 226 until harvesting from a particular tree is complete. The harvester 226 fills a bag or other container while he picks the fruit. When he fills the bag with fruit from the particular tree, he then takes the bag of fruit across the scale 260 to crop storage 244. In addition to the marker 254 from the tree, the picker 226 also has a marker on himself which identifies the particular picker 226. Two scanners 262 and 264 are on opposite sides of the scale 260. It is contemplated that the picker 226 will wear the marker for the tree on one arm and the marker for himself on the other arm. As the picker passes over the scale to crop storage 244, he and the fruit are weighed as well as scanned by scanners 262 and 264. He then dumps his crop into crop storage 244, lightening his weight. The picker 226 is weighed again as he passes over the scale 260. The difference in weight is the weight of the crop placed in the crop storage 244. Another way to do this is to weight the picker 226 initially and then store this information in a memory. Then when the picker 226 initially crosses the scale 260, his weight is subtracted from the weight to determine the weight of the crop. Of course, more than one bag of fruit will be required to harvest all the fruit from a particular tree so this scanning and weighing process is repeated until substantially all the fruit is obtained from the tree. The sum of all the incremental weights merely have to be totaled in order to come up with the yield from the tree. Sometime during the process of picking the fruit, the picker 226 fills a sample bag with representative fruit from the tree 222. Preferably, the sample bag will be filled initially so that a representative sample is assured. The last step that the picker takes with the fruit from a particular tree is to tie the sample bag off at the top and take the tree marker 254 from his arm and place it on the tied bag. He then places the bagged fruit into crop storage. When the marker 254 is detected or the bag is found, a quality test is run on the crop sample within the bag. The end result is that the yield can be obtained as well as the quality data from the system shown in FIGS. 8 and 9.

These sample bags provide samples for fruit quality analyses from each tree throughout the storage and processing history of the sample. These data can provide information not only on the fruit quality from each tree at picking time, but also on a limitless list of other factors, such as how well the fruit from a particular tree stores. Such information could, among other things, provide a rational basis for selecting budwood for generating genetically superior new trees. When the last quality analysis is performed on a sample, the tree ID tags or markers 254 are collected, sorted and made ready for the next harvest.

The system, provides yield from each tree, weight of fruit picked by each employee, and it preserves the tree identity of a fruit sample throughout the processing and storage cycle.

The quality test results are then kept so that the output of quality of the crop can be compared from year to year. Different grades or quality of crops may fetch different levels of premium crop price over a mixed quality crop which would be obtained by maximizing yield. Advantageously, the farmer can then optimize the application of chemicals, fertilizer, water and other inputs to the individual field area or crop management area to produce the quality of product that will maximize profits to the farmer. A further advantage is that processors of higher grades of quality crops will waste less of the crop in preparing the end product.

The need for electronic scales and scanners at each dumping station will require the development of a system that fits into the grower's operations. One idea is to construct a low, self-propelled carrier that holds, perhaps, two bins on a motorized conveyor belt; but tows a trailer that holds, perhaps, four bins. The bin trailer is equipped with rollers, and is close-coupled with the carrier, so that bins can be moved onto it from the conveyor. Low platforms with electronic scales and scanners are mounted on each side of the self-propelled carrier for pickers to step onto and over as they approach the bin to dump their bags. Empty bins are distributed through the orchard, and the pickers place new bins onto the front of the conveyor as they are filled and moved onto the trailer. When the trailer is full, a tractor brings a new trailer to replace it, and tows the full trailer away. One dumping station with platforms on each side could service pickers from four rows of trees as it moves through the orchard. With four pickers on each row, it could serve a crew of 16.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for mapping crop quality with respect to field location comprising the steps of:

selecting a field position to sample for crop quality;

determining the field position of a harvester;

inserting a marker into [the] *a* crop harvest stream of the [harvesting apparatus] *harvester* when the determined field position substantially corresponds to a selected field position;

detecting the marker after the harvested crop is removed from the field[:]*;* and removing the marker and a portion of the harvested crop near the marker for a quality sample.

2. The method for mapping crop quality with respect to field location of claim 1 further comprising the step of applying a quality test of the quality sample.

3. The method for mapping crop quality with respect to field location of claim 1 wherein the step of determining the field position of a harvester further comprises the step of triangulating a position from signals received from at least four satellites.

4. The method for mapping crop quality with respect to field location of claim 1 wherein the step of determining the field position of a harvester further comprises the step of determining [the] *a* location of *the harvester using* a global-positioning system onboard the harvester.

5. The method for mapping crop quality with respect to field location of claim 4 wherein the step of inserting a marker into the crop harvest stream of the harvester when the determined field position matches a selected field position further comprises the steps of:

converting a selected field location into a value;

comparing said value representing the selected filed location a value representing an actual field position output from the global-positioning system; and sending a signal to insert a marker into the stream of harvested crops when the selected value representing the field location compares substantially with a value representing the actual field position from the global-positioning system.

6. The method for mapping crop quality with respect to field location of claim 1 wherein the step of detecting the marker after the harvested crop is removed from the field further comprises the steps of:

moving [a] *the* crop with respect to a detector;

directing a radio wave of a first frequency toward the crop; and detecting a radio wave at second frequency when the marker passes the detector.

7. The method for mapping crop quality with respect to [a plurality of] field location[s] of claim 1 wherein the step of determining the field position of a harvester comprises determining the position of a tree.

8. The method for mapping crop quality with respect to [a plurality of] field location[s] of claim 7 wherein the step of inserting a marker into the crop harvest stream of the harvester includes placing a marker on a sampling of fruit harvested from [the] *a* selected tree.

9. The method for mapping crop quality with respect to [a plurality of] field location[s] of claim 8 wherein the step of removing the marker and a portion if the harvested crop includes removing a bag of fruit having a marker on said bag.

10. A farming apparatus comprising:

a harvester that harvests crops;

a first memory portion for storing values representing selected field locations, including a value representing a first selected field location;

a positioning system associated with said harvester and connected to said first memory portion, said positioning system outputting values representing an actual position of said harvester;

a comparator for comparing values from said global-positioning system and the values representing the selected field positions, said comparator outputting a trigger signal when one of the values representing the selected field position substantially corresponds to a value representing actual position of the harvester from the global-positioning system;

a plurality of markers, including a first marker, each of the plurality of markers being identifiable from one another;

a holder and dispenser of markers that inserts a marker into the harvested crop stream in response to the trigger signal; and a correlation device that correlates the first marker with the first selected field location.

11. The farming apparatus of claim 10 wherein the correlation device includes a second memory portion for storing [which marker was dispensed for each] *a* selected field position where [a marker] *at least one of the plurality of markers* was dispensed from the holder and dispenser.

12. The farming apparatus of claim 10 wherein the positioning system is a global-positioning system.

13. The farming apparatus of claim 10 wherein the plurality of markers further comprise a body which will remain in the same approximate location with respect to the crop as it is harvested.

14. The farming apparatus of claim 13 wherein *at least one of* the plurality of markers further [comprise] *comprises* a device that emits a second radio frequency signal having a second frequency in response to directing a first radio signal frequency having a first frequency toward the *at least one* marker, said second radio frequency signal including an identifier unique to [a particular] *at least one* marker.

15. A farming apparatus for use with a global-positioning system comprising:

a first memory portion for storing values representing selected field locations, and for storing a first value representing a *first* selected field location;

a comparator for comparing values representing locations of a global-positioning system and the values representing selected field positions from said first memory, said comparator outputting a trigger signal when the *first* value representing the selected field position substantially corresponds to [the] *a* value representing [the] *an* actual position of the global-positioning system;

a *a plurality of* crop markers including a first crop marker, each of the crop markers being identifiable from one another;

a holder and dispenser of crop markers [for dispensing] *that dispense* a crop marker in response to [a] *the* trigger signal; and a correlation mechanism that correlates the first crop marker with the first selected field location.

16. The farming apparatus for use with a global-positioning system of claim 15 wherein the correlation mechanism comprises a second memory portion for storing which *of a plurality of* crop [marker] *markers* was dispensed for each selected field position where [a marker] *at least one of the plurality of markers* was dispensed.

17. A method for mapping crop quality with respect to orchard location comprising the steps of:

selecting a tree to sample for crop quality;

inserting a marker into [the] *a* crop harvest stream;

detecting the marker after the harvested crop is removed from the field[:]*;* and removing the marker and a portion of the harvested crop near the marker for a quality sample.

18. The method for mapping crop quality with respect to an orchard of claim [1] *17* wherein the step of inserting a marker into the crop harvest stream includes placing a bag of crop material from a particular tree with a tree identification tag attached thereto into the crop harvest stream.

*19. A method for sampling portions of a crop comprising:*

*during harvesting of a crop, physically placing a marker near or with a portion of the crop in a crop stream;*

*electronically recording a field location;*

*associating the field location with the marker; and*

*at a time later than the recording of the field location, using the recorded field location to identify the field location of the portion of the crop stream near or with the marker.*

*20. The method of claim 19 wherein physically placing a marker near or with a portion of the crop includes placing a portion of the crop within the marker.*

*21. The method of claim 19 further including determining the field location from which the portion of the crop was taken.*

*22. The method of claim 21 wherein determining the field location includes using a global positioning system to determine the field location.*

*23. The method of claim 21 wherein physically placing a marker near or with a portion of the crop includes placing a portion of the crop within the marker, said marker having field location information thereon.*

*24. The method of claim 19 further comprising associating further data with the portion of the crop with or near the marker and the field location associated with the marker.*

*25. The method of claim 19 further comprising associating data related to the quality of the portion of the crop with or near the marker and the field location associated with the marker.*

*26. A method comprising:*

*introducing a plurality of markers into a crop stream of a harvester, each marker introduced at a different location of the harvester in a field;*

*electronically recording a field location and associating the location with one of the plurality of markers introduced into the crop stream; and*

*at a time later than the recording of the field location, using the recorded field location to identify the field location of crops in the stream situated near the marker.*

*27. The method of claim 26 further comprising analyzing the crops in the stream situated near the marker for quality.*

*28. The method of claim 19 further comprising:*

*determining a field location;*

*taking a sample of the crop associated with the marker;*

*analyzing the crop sample for quality;*

*correlating the field location from which the crop sample was taken, and the quality of the crop sample; and*

*using the correlated field location from which the crop sample was taken, and the quality of the crop sample to determine future field use.*

*29. The method of claim 28 wherein the taking step includes placing the crop sample within a container.*

*30. The method of claim 28 wherein electronically recording the field location includes using a global positioning system to determine the field location.*

*31. The method of claim 30 wherein the taking step includes placing the crop sample within a container.*

*32. The method of claim 30 wherein taking a sample of a crop further comprises:*

*placing the sample within a container having a field location information thereon:*

*placing the container into a harvest stream; and*

*removing the container from the harvest stream.*

*33. The method of claim 28 further comprising associating further data with the crop sample and field location.*

* * * * *